(12) United States Patent
Viviroli et al.

(10) Patent No.: US 6,886,438 B2
(45) Date of Patent: May 3, 2005

(54) DEVICE FOR MEASURING THE LENGTH OF A CABLE FOR PROCESSING

(75) Inventors: Stefan Viviroli, Horw (CH); Daniel Fischer, Lucerne (CH)

(73) Assignee: Komax Holding HG, Dierikon (CH)

( * ) Notice: Subject to any disclaimer, the term of this patent is extended or adjusted under 35 U.S.C. 154(b) by 0 days.

(21) Appl. No.: 10/714,249

(22) Filed: Nov. 13, 2003

(65) Prior Publication Data

US 2004/0099108 A1 May 27, 2004

(30) Foreign Application Priority Data

Nov. 26, 2002 (EP) .............................................. 02406024

(51) Int. Cl.⁷ ................................................. B23P 23/00
(52) U.S. Cl. .............................. 83/13; 83/76.8; 83/947; 81/9.51
(58) Field of Search .............................. 83/947, 13, 73, 83/76.8; 81/9.51

(56) References Cited

U.S. PATENT DOCUMENTS

| | | | |
|---|---|---|---|
| 6,135,164 A | | 10/2000 | Celoudoux et al. |
| 6,176,155 B1 | * | 1/2001 | Palmowski et al. .......... 81/9.51 |
| 6,336,267 B1 | * | 1/2002 | Hoffa ........................... 29/745 |
| 6,658,719 B2 | * | 12/2003 | Thoms et al. ............... 29/564.4 |
| 6,766,724 B2 | * | 7/2004 | Bernardelle et al. .......... 83/861 |
| 2002/0174759 A1 | * | 11/2002 | Bernardelle et al. .......... 83/947 |

FOREIGN PATENT DOCUMENTS

| | | |
|---|---|---|
| RU | 1 831 217 | 2/1996 |
| RU | 1 394 303 | 5/1998 |

* cited by examiner

Primary Examiner—Charles Goodman
(74) Attorney, Agent, or Firm—Butzel Long

(57) ABSTRACT

An apparatus and method for measuring the length of a cable for obtaining a reference measurement wherein a belt drive advances the cable through a first gripper until the cable is under separating/stripping cutters which cut the cable. The cable is advanced by a length measured by the belt drive, a leading cable-end being passed under a cable-end detector, and the cable is held tightly by the first gripper and with a linear backward movement, the cable is withdrawn until the leading cable-end leaves the cable-end detector. A correction factor is calculated by a control from the distance between the separating/stripping cutters and the cable-end detector and from the travel of the first gripper during the backward movement.

11 Claims, 4 Drawing Sheets

DEVICE FOR MEASURING THE LENGTH OF A CABLE FOR PROCESSING

BACKGROUND OF THE INVENTION

The present invention relates to a device and a method for measuring the length of a cable which can be fed to processing stations for processing, wherein a cable-advancing device advances the cable, and feeding devices feed the cable-ends to the processing stations.

Usually, the length of the first cable of a production batch is checked manually. The deviation of the cable length from the specification is input to the control of the cable-advancing device as a correction factor.

The manual checking of the cable length is time-and labor-intensive. Moreover, erroneous measurements or erroneous corrections are not avoided.

SUMMARY OF THE INVENTION

The device and method according to the present invention provide a solution for avoiding the disadvantages of the known device and create a device and a method for registering the length of a cable destined for processing by means of which the cable length can be measured reliably.

The present invention concerns a device for measuring the length of a cable being fed to processing stations for processing, wherein a cable-advancing device advances the cable and feeding devices feed the cable-ends to the processing stations. The device comprises a cable-end detector for detecting a leading cable-end of the cable being advanced by the cable-advancing device along a measuring path, the cable-end detector being positioned at an end of the measuring path for generating a reference measurement signal representing a detection of the leading cable-end. The cable-end detector has piezo-elements arranged on a support with a foot, the foot being movable into and out of contact with the cable. Either the cable is moved relative to the cable-end detector or the cable-end detector is movable along the measuring path at least until the foot leaves contact with the leading cable-end.

The present invention concerns a method for measuring a length of a cable being fed to processing stations for processing, wherein a cable-advancing device advances the cable and feeding devices feed cable-ends of the cable to the processing stations, comprising the steps of: a) operating the cable-advancing device to advance the cable under separating/stripping cutters which cut off the leading cable-end of the cable; b) advancing the cable by a length measured by the cable-advancing device, the leading cable-end being passed under a cable-end detector; and c) moving one of the cable and the cable-end detector until the leading cable-end leaves the cable-end detector, a difference between the length measured in said step b) and the movement in said step c) representing an actual length of the cable.

The advantages achieved by the device and method according to the present invention are that measurement of the actual length of the advanced cable is independent of the pressure of the transport rollers or transport belts of the cable-advancing device. Furthermore, the measurement is independent of the cable insulation and independent of wrinkling of the cable insulation by the cable-advancing device or the straightening apparatus while the cable is being advanced.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
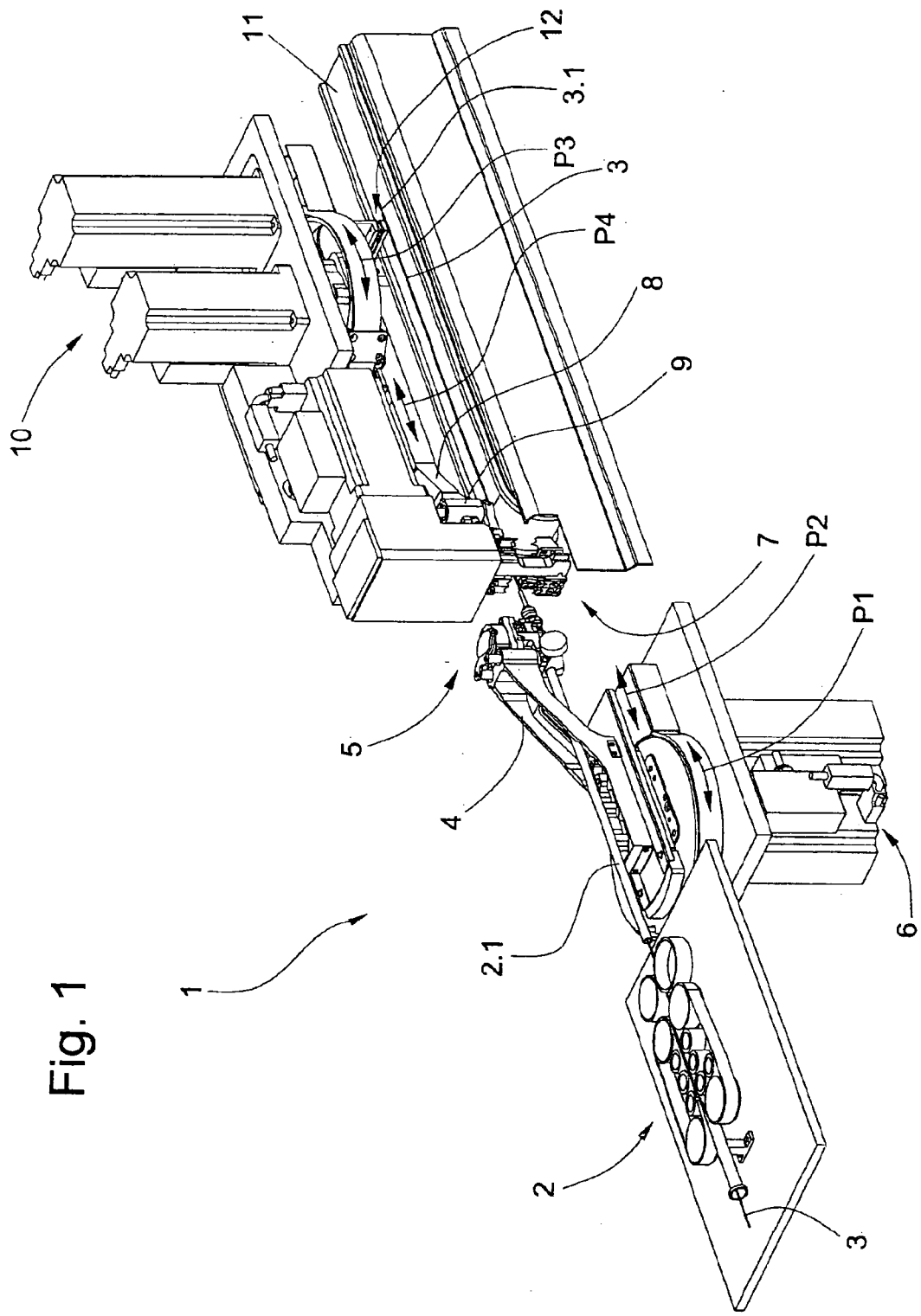
FIG. 1 a schematic perspective view of a cable-processing machine with two swivel-arms in accordance with the present invention.
Figure 2:
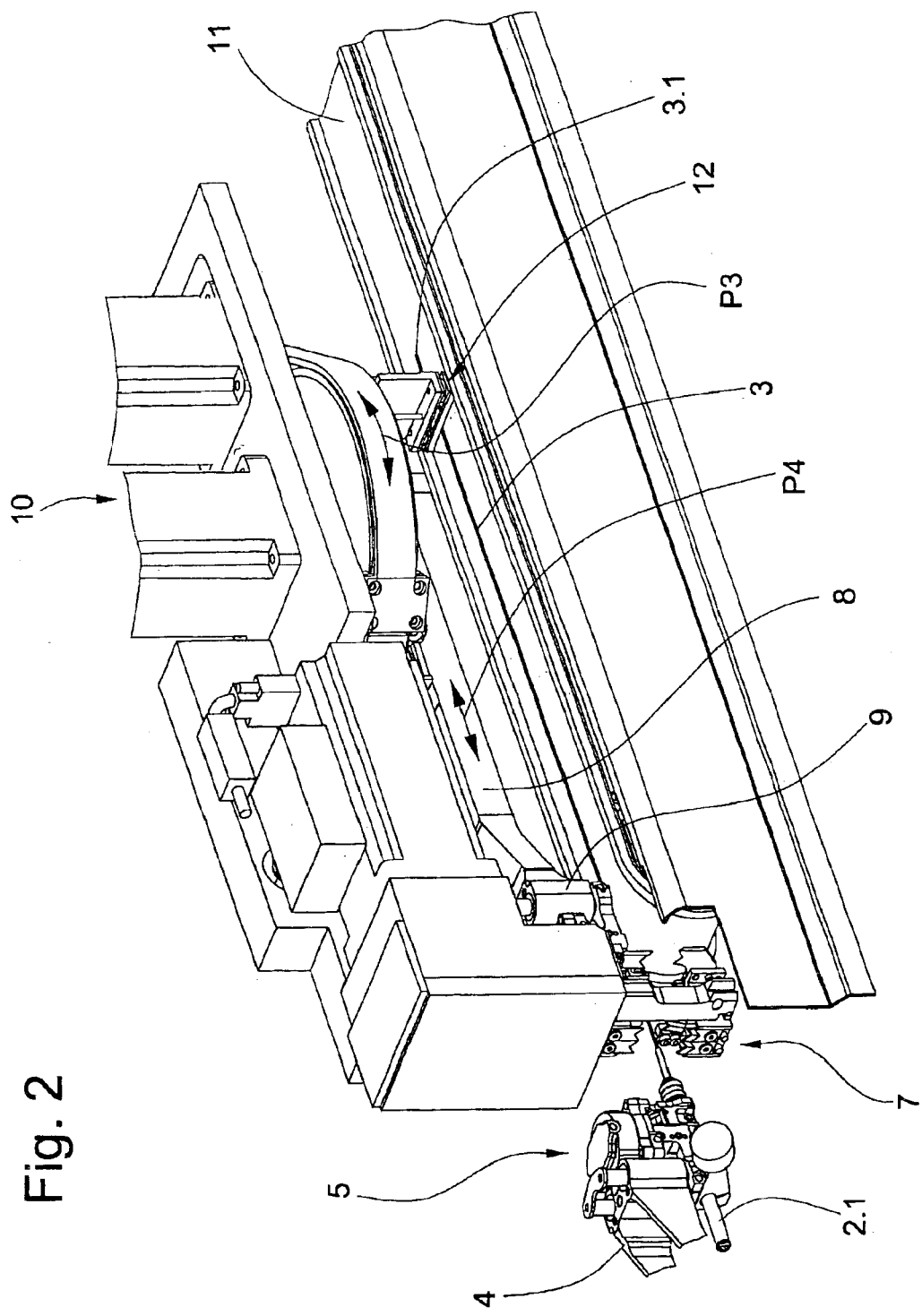
FIG. 2 is an enlarged perspective view of a measuring path with a cable-end detector as shown in FIG. 1.

FIGS. 1 and 2 show a cable-processing machine 1 with a cable-advancing device executed as a belt drive 2 which feeds a cable 3 through a guide 2.1 to a first swivel-arm 4 with a first gripper 5. By means of first drives 6, the first swivel-arm 4 can be set into a rotational movement symbolized with an arrow P1 and/or into a linear movement symbolized with an arrow P2. With separating/stripping cutters 7 the cable 3 can be separated and/or stripped of insulation.

Furthermore, the cable-processing machine 1 has a second swivel-arm 8 with a second gripper 9. By means of second drives 10, the second swivel-arm 8 can be set into a rotational movement symbolized with an arrow P3 and/or into a linear movement symbolized with an arrow P4. By means of the rotating movement P1 and the linear movement P2, the first swivel-arm 4 as a feeding device serves not-shown processing stations (for example crimping presses) arranged at the side of the longitudinal axis of the cable 3 with leading cable-ends. By means of the rotating movement P3 and the linear movement P4, the second swivel-arm 8 as feeding device serves not-shown processing stations (for example crimping presses) arranged at the side of the longitudinal axis of the cable 3 with trailing cable-ends.

Measurement of the actual length of a cable advanced by the belt drive 2 (also know as the reference measurement) is executed in accordance with the following steps:

a) The belt drive 2 pushes the cable 3 through the first gripper 5 until the cable is under the separating/stripping cutters 7 which cut off the leading end of the cable 3.

b) The cable 3 is advanced further, a leading cable-end 3.1 being transported by means of a transport belt 11. The advanced cable length is constantly measured by the belt drive 2.

c) The cable 3 is advanced by a length measured by the belt drive 2, the leading cable-end 3.1 being moved under a cable-end detector 12. After the advance of the cable 3, the cable-transport-belt 11 is brought to rest.

d) The cable-end detector 12 presses the cable 3 onto the cable-transport-belt 11. The first gripper 5 holds the cable 3 tightly, the first swivel-arm 4 pulling the cable back with a linear backward movement in the direction P2. As soon as the leading cable-end 3.1 leaves the cable-end detector 12, the backward movement P2 of the first swivel-arm 4 is stopped by means of a signal of the cable-end detector 12.

e) The travel of the first swivel-arm 4 during the backward movement P2 was registered in the step d). From the cable-length measured by the belt drive 2, from the distance between the separating/stripping cutters 7 and the cable-end detector 12 (measuring path), and from the path of the first swivel-arm 4, a correction factor is calculated by the control which is taken into account in the cable-processing following after the reference measurement, in that the length advanced by the belt drive 2 is corrected.

For example, the cable length measured by the belt drive 2 can be 520 mm, the distance between the separating/stripping cutters 7 and the cable-end detector 12 can be 500 mm, and the backward travel of the first swivel-arm 4 can be 10 mm. In this example, the actual cable length advanced by the belt drive 2 is not 520 mm but only 510 mm. The cable-advance measured by the belt drive 2 deviates negatively by 10 mm. The deviation determined in this manner by the reference measurement is taken into account in the subsequent cable-processing in relation to the cable length to be processed. The deviation determined with the reference measurement applies only to the specific type of cable used for the reference measurement. Other types of cables require new reference measurements.

Figure 3:
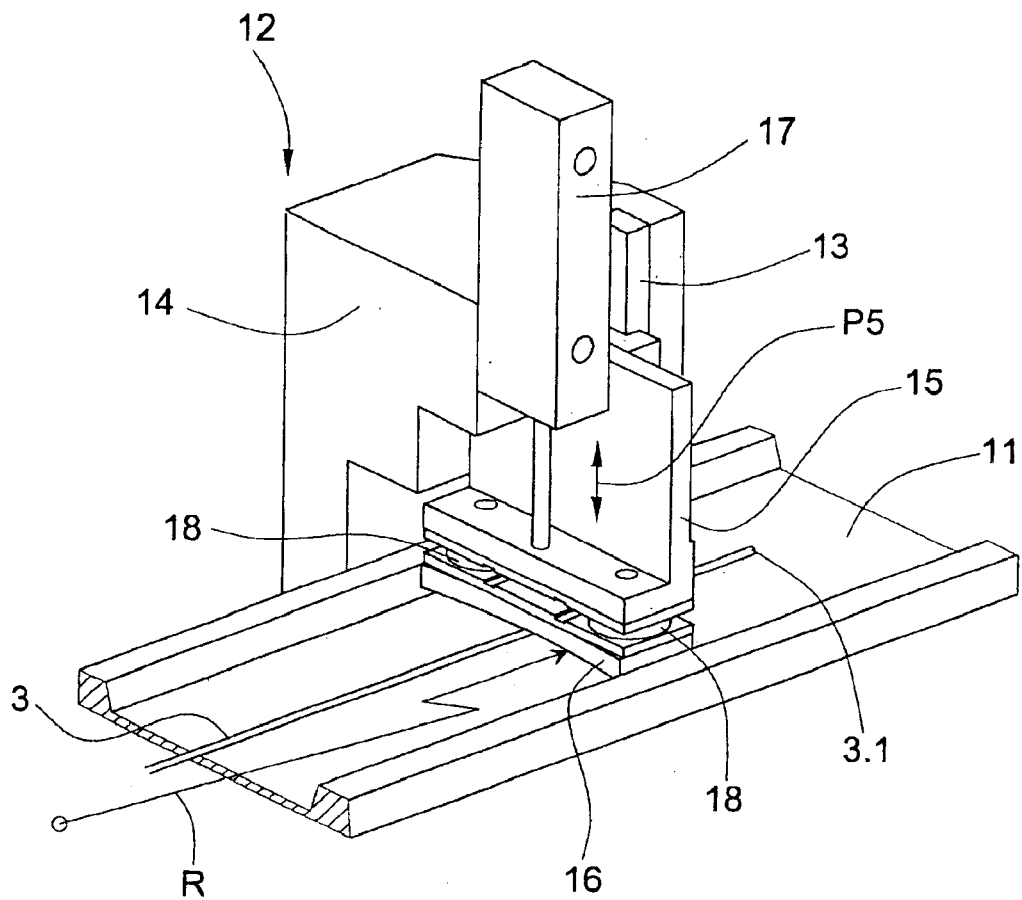
FIG. 3 is an enlarged perspective view of the cable-end detector shown in FIG. 2.
Figure 4:
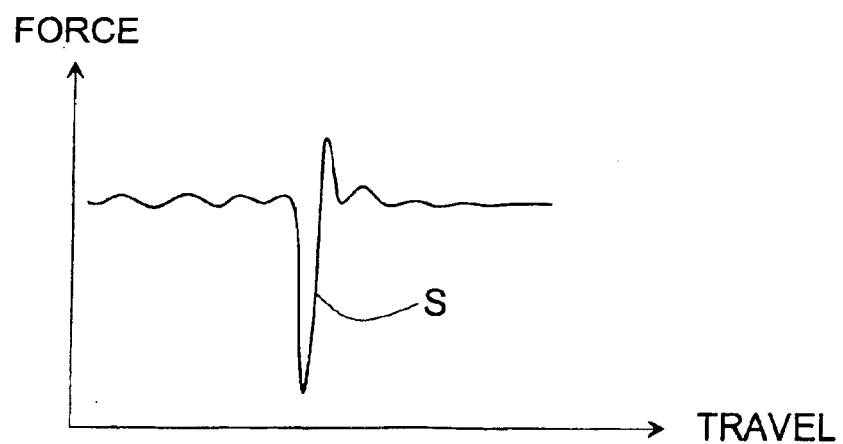
FIG. 4 a plot of a signal generated by the cable-end detector shown in FIG. 3.

FIG. 3 shows details of the cable-end detector 12, which detects the presence of the leading cable-end 3.1 on the cable-transport-belt 11. A support 15 with foot 16 which is movable along a guide 13 of a housing 14 is moved by means of a cylinder 17 in the direction of arrow P5. Arranged between the support 15 and the foot 16 are piezo-elements 18 which detect the pressure of the foot 16 on the leading cable-end 3.1 and on the cable-transport-belt 11. When the cable 3 is pulled back, as soon as the leading cable-end 3.1 leaves the foot 16, the piezo-elements 18 generate a signal S as shown in FIG. 4. If the leading cable-end 3.1 leaves the foot 16, the pressure on the piezo-elements 18 suddenly falls, and rises again when the foot 16 returns into contact with the cable transport belt 11. The signal S stops the linear movement P2 of the first swivel-arm 4. The foot 16 has a radius R so that laterally offset leading cable-ends 3.1 are correctly detected.

Figure 5:
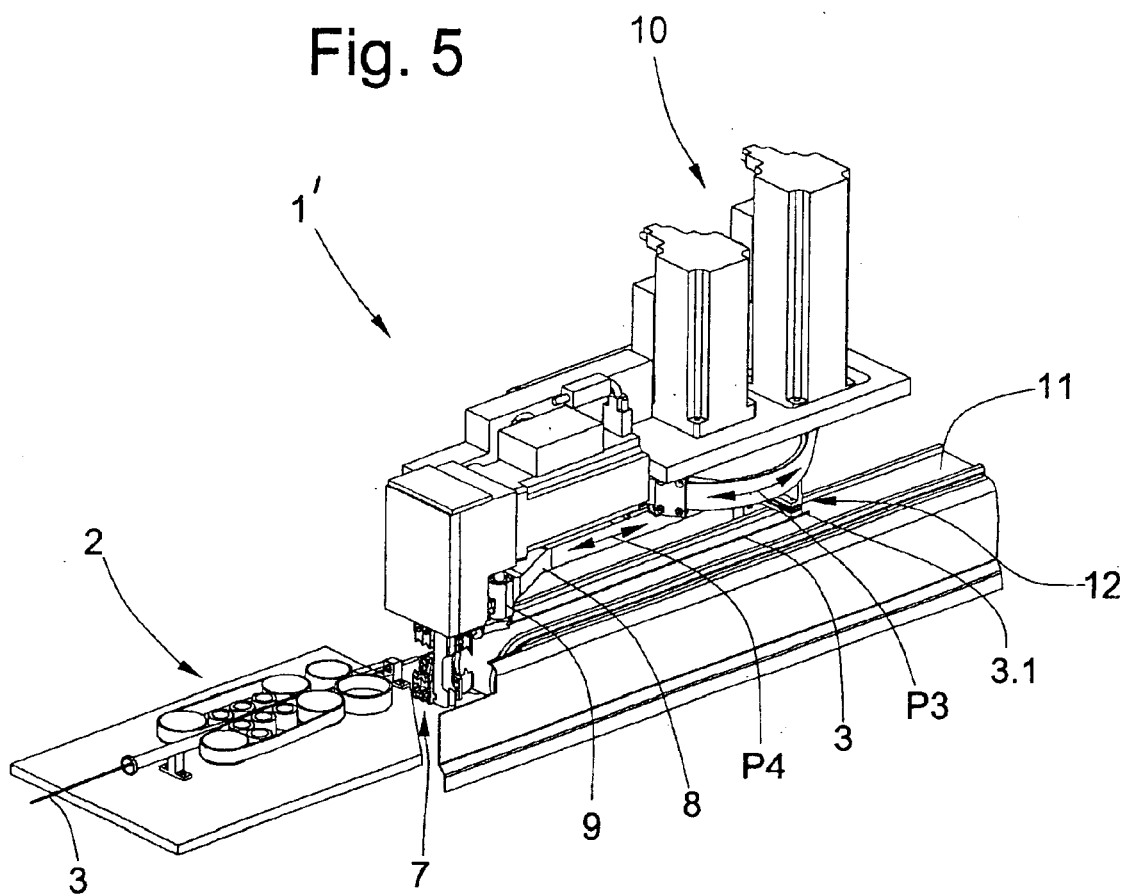
FIG. 5 and FIG. 6 are perspective views of alternate embodiments of the cable-processing machine according to the present invention.

FIG. 5 shows an alternate embodiment cable-processing machine 1' with only one swivel-arm. The first swivel-arm 4, shown in FIGS. 1 and 2, is not present. As described above, the cable 3 is advanced by means of the belt drive 2 until the cable is under the separating/stripping cutters 7, which cut off the leading end of the cable 3. The cable 3 is then advanced further, the advancing cable-end 3.1 being transported by means of the cable-transport-belt 11, and the advanced cable length being continuously measured by the belt drive 2. After advance of the reference length measured by the belt drive 2, the cable-end detector 12 presses the cable 3 onto the cable-transport-belt 11, and with a backward movement the belt drive 2 pulls the cable 3 back.

As soon as the leading cable-end 3.1 leaves the cable-end detector 12, the backward movement of the belt drive 2 is stopped by means of the signal generated by the cable-end detector 12. The correction of the deviation determined from the cable advance and cable withdrawal takes place in a manner similar to that described above.

Figure 6:
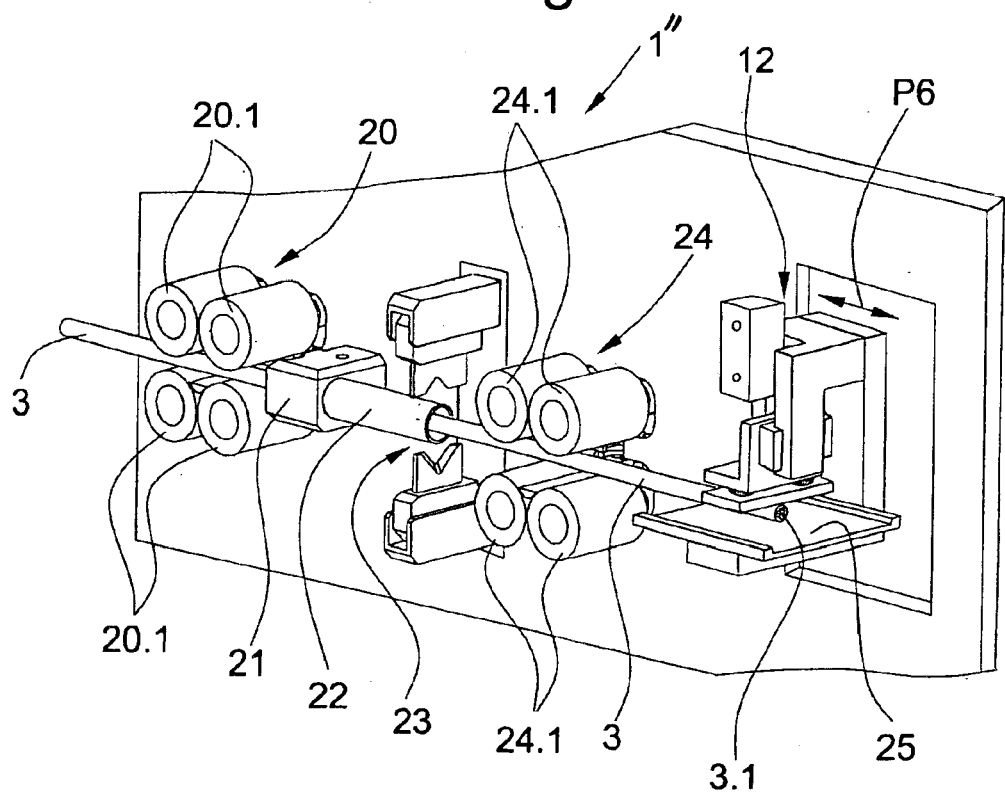

FIG. 6 shows a second alternate embodiment cable-end processing machine 1" with pairs of rollers serving as a cable-advancing device. The cable 3 can be advanced and withdrawn by means of a first transport unit 20 having upper and lower drivable pairs of rollers 20.1 causing the movement of the cable 3. In a feeder tube 22 serving as a feeding device, which can be swiveled by means of a swivel mechanism 21, the leading cable-end 3.1 is advanced as far as a processing station executed as a separating cutter 23, the separating cutter cutting off the leading cable-end 3.1.

For the purpose of processing the trailing cable-end, the cable 3 can be advanced and withdrawn by means of a second transport unit 24 having upper and lower drivable pairs of rollers 24.1 causing the movement of the cable 3. During measurement of the cable length, the pairs of rollers 24.1 are open.

After cutting, the cable 3 is advanced further by means of the first transport unit 20 which serves as the cable-advancing unit, the advanced cable length being continuously measured by the transport unit 20. After advance of the reference length measured by the transport unit 20, the cable-end detector 12 presses the cable 3 onto a plate 25, and with a backward movement the transport unit 20 pulls the cable 3 back.

As soon as the leading cable-end 3.1 leaves the cable-end detector 12, the backward movement of the transport unit 20 is stopped by means of a signal of the cable-end detector 12. The correction of the deviation determined from the cable-advance and cable withdrawal takes place in a manner similar to that described above.

The cable-end detector 12 can also be executed to be movable in the direction symbolized by an arrow P6. In this case, no withdrawal to measure the cable length takes place. After being lowered, the cable-end detector 12 is moved, for example electrically, in the horizontal direction P6 until the foot 16 of the cable-end detector 12 leaves the leading cable-end 3.1. The distance traveled by the cable-end detector 12 corresponds to the withdrawn length of the cable 3. The correction of the deviation determined from the cable-advance and the distance traveled by the cable-end detector 12 takes place in a manner similar to that described above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for measuring a length of a cable being fed to processing stations for processing, wherein a cable-advancing device advances the cable and feeding devices feed cable-ends of the cable to the processing stations, comprising the steps of:
    a) operating the cable-advancing device to advance the cable under separating/stripping cutters which cut off the leading cable-end of the cable;
    b) advancing the cable by a length measured by the cable-advancing device, the leading cable-end being passed under a cable-end detector; and
    c) moving one of the cable and the cable-end detector until the leading cable-end leaves the cable-end detector, a difference between the length measured in said step b) and the movement in said step c) representing an actual length of the cable.

2. The method according to claim 1 wherein said step c) is performed by withdrawing the cable relative to the cable-end detector.

3. The method according to claim 1 wherein said step c) is performed by moving the cable-end detector relative to the leading cable-end.

4. The method according to claim 1 including using the actual length of the cable to calculate a correction factor in a control for use in subsequent cable-processing.

5. The method according to claim 4 including using the correction factor to correct a length of a subsequent cable advanced by the cable-advancing device.

6. A device for measuring the length of a cable being fed to processing stations for processing, wherein a cable-advancing device advances the cable and feeding devices feed the cable-ends to the processing stations, comprising:
    a cable-end detector for detecting a leading cable-end of a cable being advanced by a cable-advancing device along a measuring path, said cable-end detector being positioned at an end of the measuring path for generating a reference measurement signal representing a detection of the leading cable-end.

7. The device according to claim 6 wherein said cable-end detector has piezo-elements arranged on a support with a foot, said foot being movable into and out of contact with the cable.

8. The device according to claim 6 wherein said cable-end detector has a foot being movable into and out of contact with the cable, said cable-end detector being movable along the measuring path at least until said foot leaves contact with the leading cable-end.

9. A cable processing apparatus comprising:
   a cable-advancing device for advancing a cable with a leading cable-end along a measuring path; and
   a cable-end detector for detecting a leading cable-end of a cable being advanced by a cable-advancing device along a measuring path, said cable-end detector being positioned at an end of the measuring path for generating a reference measurement signal representing a detection of the leading cable-end.

10. The device according to claim 9 wherein said cable-end detector has piezo-elements arranged on a support with a foot, said foot being movable into and out of contact with the cable.

11. The device according to claim 9 wherein said cable-end detector has a foot being movable into and out of contact with the cable, said cable-end detector being movable along the measuring path at least until said foot leaves contact with the leading cable-end.

* * * * *